(12) United States Patent
Chan et al.

(10) Patent No.: US 7,151,047 B2
(45) Date of Patent: Dec. 19, 2006

(54) STABLE, WATER-SOLUBLE QUANTUM DOT, METHOD OF PREPARATION AND CONJUGATES THEREOF

(76) Inventors: Warren Chan, 477 Richmond Street West, Suite 308, Toronto, Ontario (CA) M5V 3E7; Hans Fischer, 882 Davenport Road, Toronto, Ontario (CA) M6G 2B6; Sawitra Mardyani, 415-34 Leith Hill Road, North York, Ontario (CA) M2J 1Z4; Wen Jiang, 672C-6.0 Harbord Street, Toronto, Ontario (CA) M5S 3L1

( * ) Notice: Subject to any disclaimer, the term of this patent is extended or adjusted under 35 U.S.C. 154(b) by 0 days.

(21) Appl. No.: 11/116,454

(22) Filed: Apr. 28, 2005

(65) Prior Publication Data

US 2006/0014315 A1    Jan. 19, 2006

Related U.S. Application Data

(60) Provisional application No. 60/565,903, filed on Apr. 28, 2004.

(51) Int. Cl.
*H01L 51/40* (2006.01)
*H01G 9/20* (2006.01)
*H01L 29/06* (2006.01)

(52) U.S. Cl. .................... 438/497; 438/962; 977/773; 977/774; 977/775

(58) Field of Classification Search ................ 438/99, 438/82, FOR. 135, 962, 1; 977/774, 773, 977/776; 257/14, 15, 20, 24, E39.007, E51.001, 257/9; 252/301.16; 428/402.24
See application file for complete search history.

(56) References Cited

U.S. PATENT DOCUMENTS 6,114,038 A * 9/2000 Castro et al. .......... 428/402.24

6,468,808 B1  10/2002  Nie et al.
6,699,723 B1   3/2004  Weiss et al.

OTHER PUBLICATIONS

Hanaki et al, "Semiconductor Quantum Dot/Albumin COmplex is a Long-Life and Photostable Endosome Marker". Biochemical and Biophysical Research Communication 302 (2003).*
Hines et al. "Synthesis and Characterization of Strongly Luminescing Zn-S-Capped Nanocrystals". Journal of Physical Chemistry, 100, (1996). pp. 468-471.*

(Continued)

*Primary Examiner*—Michelle Estrada
*Assistant Examiner*—Quovaunda V Jefferson
(74) *Attorney, Agent, or Firm*—Birch, Stewart, Kolasch & Birch, LLP (57) ABSTRACT

A method for manufacturing powdered quantum dots comprising the steps of: a) reacting quantum dots comprising a core, a cap and a first ligand associated with the outer surfaces thereof with a second ligand, the second ligand displacing the first ligand and attaching to the outer surfaces of the quantum dots, b) isolating the quantum dots having the attached second ligand from the reaction mixture, c) reacting the isolated quantum dots having the attached second ligand with a small organic molecule whereby the small organic molecule attaches to the second ligand, d) reacting the quantum dots having the attached small organic molecule with a cross-linking agent to cross-link the small organic molecule attached to the second ligand with an adjacent second ligand attached to the surfaces of the quantum dots, e) isolating the quantum dots formed in step (d); and f) drying the isolated quantum dots to form powdered quantum dots. The invention includes the quantum dots.

17 Claims, 5 Drawing Sheets

OTHER PUBLICATIONS

Braun, Hans-G. "Microprinting- A New Approach to Study Competitive Structure Formation on Surface". Macromolecule Rapid Communication 20 (1999). pp. 325-327.*

Alivisatos, "Semiconductors Clusters, Nanocrystals, and Quantum Dots", Science, vol. 271, 1996, pp. 933-937.

Alivisatos, "Perspectives on the Physical Chemistry of Semiconductor Nanocrystals", J. Phys. Chem., vol. 100, 1996, pp. 13226-13239.

Brus, "Quantum Crystallites and Nonlinear Optics", Appl. Phys., vol. A53, 1991, pp. 465-474.

Hines et al., "Synthesis and Characterization of Strongly Luminescing ZnS-Capped CdSe Nanocrystals", J. Phys. Chem., vol. 100, 1996, pp. 468-471.

Dabbousi et al., "(CdSe)ZnS Core-Shell Quantum Dots: Synthesis and Characterization of a Size Series of Highly Luminescent Nanocrystallites", J. Phys. Chem. B. vol. 101, 1997, pp. 9463-9475.

Chan et al., "Quantum Dot Bioconjugates for Ultrasensitive Nonisotopic Detection", Science, vol. 281, 1998, pp. 2016-2018.

Bruchez et al., "Semiconductor Nanocrystals as Fluorescent Biological Labels", Science, vol. 281, 1998, pp. 2013-2016.

Mattoussi et al., "Self-Assembly of CdSe-ZnS Quantum Dot Bioconjugates Using an Engineered Recombinant Protein", J. Am. Chem. Soc., vol. 122, 2000, pp. 12142-12150.

Kim et al., "Oligomeric Ligands for Luminescent and Stable Nanocrystal Quantum Dots", J. Am. Chem. Soc., vol. 125, 2003, pp. 14652-14653.

Dubertret et al., "In Vivo Imaging of Quantum Dots Encapsulated in Phospholipid Micelles", Science, vol. 298, 2002, pp. 1759-1762.

Wang et al., "Stabilization of Inorganic Nanocrystals by Organic Dendrons", J. Am. Chem. Soc., vol. 124, 2002, pp. 2293-2298.

Wu et al., "Immunofluorescent labeling of cancer marker Her2 and other cellular targets with semiconductor quantum dots", Nature Biotechnology, vol. 21, 2003, 41-46.

Guo et al., "Luminescent CdSe/CdS Core/Shell Nanocrystals in Dendron Boxes: Superior Chemical, Photochemical and Thermal Stability", J. Am. Chem. Soc., vol. 125, 2003, pp. 3901-3909.

Peng et al., "Epitaxial Growth of Highly Luminescent CdSe/CdS Core/Shell Nanocrystals with Photostability and Electronic Accessibility", J. Am. Chem. Soc., vol. 119, 1997, pp. 7019-7029.

Yu et al., "Experimental Determination of the Extinction Coefficient of CdTe, CdSe, and CdS Nanocrystals", Chem. Mater., vol. 15, 2003, pp. 2854-2860.

* cited by examiner

STABLE, WATER-SOLUBLE QUANTUM DOT, METHOD OF PREPARATION AND CONJUGATES THEREOF

RELATED APPLICATION

This application claims the benefit of U.S. Provisional Patent Application No. 60/565,903 filed Apr. 28, 2004 which is incorporated herein by reference.

FIELD OF THE INVENTION

The present invention relates to a method of production of a water-soluble quantum dot, and the quantum dot thereby produced.

BACKGROUND OF THE INVENTION

Semiconductor nanocrystals, often referred to as quantum dots (QDs), offer a viable alternative to presently used isotopic and non-isotopic detection systems for use in biomolecular research protocols and assays, as well as for clinical and diagnostic assays. The goal of these systems is the detection and reporting of a specific molecule that is indicative of the presence of a certain molecular, cellular or organismal entity, or of the occurrence of a particular molecular event, such as the transcription of a particular gene or the production of a particular protein within an organism. While isotopic detection systems offer a high degree of sensitivity, there are inherent problems associated with their use such as safety and disposal concerns, half-life of the isotope and where very low levels of the target molecule are present, the length of film exposure time (e.g. up to 7 days) required in order to detect a signal. While non-isotopic systems offer a safety advantage, the fluorescent reporter molecules are often susceptible to rapid fading (i.e. photobleaching). As well, while many of the currently available non-isotopic detection systems are highly sensitive, these systems rely upon the use of a secondary-antibody detection regimen wherein the actual detection is of a fluorescent or chromatogenic agent linked to a secondary-antibody targeted against a primary-antibody that binds to an antigen linked to a molecular probe against the target molecule. Successful utilization of such systems requires the use of expensive reagents that often exhibit only a limited storage or shelf-life, and further requires a user to perform a number of procedural steps, the less-than-optimal performance of which may lead to a false-negative result.

Interest from the medical and research communities regarding quantum dots stems largely from the unique optical and electrical properties that are associated with QDs. In comparison to organic fluorophores, certain types of QDs possess up to twenty times greater luminescence, are highly resistant to photobleaching, exhibit narrow spectral linewidths, and are size and materials-tuneable so as to be excitable using only a single wavelength. Problematic, however, is the fact that in order for QDs to be used in the context of a biological setting, for example, imaging and detection of and within live cells, the QD must possess a coating that makes the QD bio-compatible with biological systems, such as being aqueously soluble, and at the same time does not lessen the stability of the QD under physiological conditions. Overcoming this problem is exasperated by the fact that QDs are generally synthesized in an organic solvent as the hydrophobic solvent ligands act as stabilizing agents for QD nucleation and growth, and inhibit the aggregation of the QDs during their synthesis.

In terms of their basic structure, the synthesis of a QD comprising an inner nanoparticle-sized semiconductor "core" together with an outer semiconductor "cap" that is of a different material than the core and which binds to the core is a process that is well known in the art (U.S. Pat. Nos. 6,468,808 and 6,699,723). Usually, the QD core is selected from a combination of Group IIB–VIB, Group IIIB–VB or Group IVB—IVB elements from the periodic table, while the cap is selected from a material that, in combination with the core, results in a luminescent quantum dot. The cap is selected to passivate the core by having a higher band gap than the core, and as such, the cap is preferred to be a semi-conducting material from the Group IIB–VIB combination of elements from the periodic table.

The luminescent properties of QDs result from quantum size confinement, which occurs when metal and semiconductor core particles are smaller than their exciton Bohr radii, about 1 to 5 nm (Alivisatos, *Science*, 271, 933–37 (1996); Alivisatos, *J. Phys. Chem.*, 100, 13226–39 (1996); Brus, *Appl. Phys., A* 53, 465–74 (1991). It is known that an improvement in the QD luminescence results from the capping of a size-tunable lower band gap core particle with a higher band gap shell. For example, CdSe quantum dots passivated with a ZnS layer are strongly luminescent (35 to 50% quantum yield (QY)) at room temperature, and their emission wavelength can be tuned from blue to red by changing the particle size. Moreover, the ZnS capping protects the core surface and leads to greater stability of the quantum dot (Hines et al., *J. Phys. Chem.*, 100, 468–471 (1996); and Dabbousi et al., *J. Phys. Chem. B* 101, 9463–75 (1997)). Despite having these greater luminescent capacities, such capped QDs are not water-soluble and are thus not suitable for use in biological systems.

To date, numerous attempts have been made to produce a QD that has a bio-compatible surface that does not promote non-specific binding of the QD to molecules, does not cause an abatement of the optical properties of the QD, nor increase the size of the QD, nor negate the ability of the QD to be further coated with a desired molecule(s) of choice, but allows for the large-scale and cost effective production of the QD. QDs have been provided that have their surface modified through the addition of amphiphilic polymers, phospholipids, dendrimers, oligomeric ligands, biofunctional molecules such as deoxyribonucleic acid (DNA), and genetically-modified proteins (Chan and Nei, *Science*, 281, 2016–2018 (1998); Bruchez et al., *Science*, 281, 2013–2016 (1998); Mattoussi et al., *J. Am. Chem. Soc.*, 125, 12142–12150 (2000); Kim and Bawendi, *J. Am. Chem. Soc.*, 125, 14652–14653 (2003); Dubertret et al., *Science*, 298, 1759–1762 (2002); Wang et al., *J. Am. Chem. Soc.*, 124, 2293 (2002); Wu et al., *Nature Biotechnology*, 21, 41–46 (2003); Guo et al., *J. Am. Chem. Soc.*, 125, 3901 (2003)). While such modifications impart water solubility to the QD, such surface modifications do not allow cost-effective, commercial scale production. In an effort to provide a thin, secure organic shell around a QD without increasing the diameter of the QD so as to render the QD inaccessible to target systems or limit the number of QDs that can be attached to a target, Kim and Bawendi (*J. Am. Chem. Soc.*, 125, 14652–14653 (2003)) have succeeded in surrounding QDs with an oligomeric phosphine shell. Problematic, however, is that the approach put forward by Kim and Chan requires the complex synthesis of a stabilizing and interfacing oligophosphine ligand, thereby severely limiting the potential for the large scale production of such QDs.

It would be thus advantageous to provide a QD that has a coating that would allow for the QD to be used in conjunction with biological systems. Any coating that is provided should allow for the maintenance of long-term monodispersity of the QDs in an aqueous environment, not promote non-specific binding of the QD to other molecules, not detract from the optical properties of the QD when compared to the organic solvent soluble counterpart of the coated QD, maintain the small size of the QD, allow for the QD to be further coated with biomolecules of a range of types, and allow for the QD to be produced on a commercial scale in a cost-effective manner.

SUMMARY OF THE INVENTION

The present invention provides a method for manufacturing powdered quantum dots comprising the steps of:
a) reacting quantum dots comprising a core, a cap and a first ligand associated with the outer surfaces thereof with a second ligand, the second ligand displacing the first ligand and attaching to the outer surfaces of the quantum dots,
b) isolating the quantum dots having the attached second ligand from the reaction mixture,
c) reacting the isolated quantum dots having the attached second ligand with a small organic molecule whereby the small organic molecule attaches to the second ligand,
d) reacting the quantum dots having the attached small organic molecule with a cross-linking agent to cross-link the small organic molecule attached to the second ligand with an adjacent second ligand attached to the surfaces of the quantum dots,
e) isolating the quantum dots formed in step (d); and
f) drying the isolated quantum dots to form powdered quantum dots.

BRIEF DESCRIPTION OF THE DRAWINGS

These and other aspects of the present invention are described by reference to the following figures in which.

DETAILED DESCRIPTION OF THE INVENTION

The present invention provides a method for large-scale production of water-soluable semiconductor nanocrystals, alternatively referred to as quantum dots, in a cost-effective manner. More particularly, the present invention provides a method of producing water-soluble quantum dots wherein the quantum dots so produced are supplied to a user as a powder. The present invention also provides for a method of producing a quantum dot in a powdered form wherein the quantum dot can thereafter be conjugated to a biomolecule selected from a range of different biomolecule species. As well, the present invention provides a method of detecting a biomolecule in a sample through the use of a probe molecule-luminescent reporter molecule construct comprising a quantum dot conjugated to the probe molecule.

Definitions

The term "quantum dot" will be understood to mean a water-soluble luminescent semiconductor nanocrystal, which comprise a core, a cap and a hydrophilic attachment group.

The term "core" will be understood to mean a nanoparticle-sized semiconductor. While any core of the IIB–VIB, IIIB–VB or IVB-—IVB semiconductors can be used in the context of the present invention, the core must be such that, upon combination with a cap, a luminescent quantum dot results. A IIB–VIB semiconductor is a compound that contains at least one element from Group IIB and at least one element from Group VIB of the Periodic Table; a IIIB–VB semi conductor is a compound that contains at least one element from Group IIIB and at least one element from Group VIB of the Periodic Table, and so on. The core may be a IIB–VIB, IIIB–VB or IVB-—IVB semiconductor that ranges in size from about 1 nm to about 10 nm. In one form the core is a IIB–VIB semiconductor and ranges in size from about 2 nm to about 5 nm. Examples include a core that is CdS or CdSe.

The term "cap" will be understood to mean a semiconductor that differs from the semiconductor of the core and which binds to the core, thereby forming a surface layer on the core. The cap must be such that, upon combination with a given semiconductor core, a luminescent quantum dot results. The cap should passivate the core by having a higher band gap than the core. In this regard, the cap may be a IIB–VIB semiconductor of high band gap. In particular, the cap may be ZnS or CdS. In particular forms of the invention, the cap is ZnS when the core is CdSe or CdS and the cap is CdS when the core is CdSe.

The term "first ligand" is used to describe a passivating organic layer present on the surface of the quantum dot comprised of the organic solvent in which the quantum dot is prepared. The first ligand be displaced as described below to provide an outer coating that renders the quantum dot in a state for processing according to the method of the present invention. In one embodiment of the present invention, the first ligand is any molecule that is hydrophobic (e.g., trioctylphosphine oxide (TOPO), octylamine, or lipid-type molecules).

The term "second ligand" encompasses ligands which are used to displace the first ligand from the surface of the quantum dot. More specifically, the second ligand can be any organic group that can be attached, such as by any stable physical or chemical association, to the surface of the cap of the luminescent semiconductor quantum dot and can render the quantum dot water-soluble without rendering the quantum dot non-luminescent. Accordingly, the second ligand may comprise a hydrophilic moiety. In one embodiment, the second ligand enables the quantum dot to remain in solution for at least about one hour. In another embodiment, the second ligand enables the quantum dot to remain in solution for at least about one day. In yet another embodiment, the second ligand allows the quantum dot to remain in solution for at least about one week. The second ligand may also allow the quantum dot to remain in solution indefinitely. Desirably, the second ligand is attached to the cap by covalent bonding and is attached to the cap in such a manner that the hydrophilic moiety is exposed. The second ligand may be attached to the quantum dot via a sulfur atom. The second ligand may be an organic group comprising a sulfur atom and at least one hydrophilic attachment group. A suitable hydrophilic attachment group includes, for example, a carboxylic acid or salt thereof, a sulfonic acid group or salt thereof, a sulfamic acid group or salt thereof, an amino substituent, a quaternary ammonium salt, or a hydroxyl. The organic group of the hydrophilic attachment group of the present invention may be a $C_8$–$C_{13}$ alkyl group or an aryl group. $C_8$–$C_{13}$ alkyl groups have been quite useful and so has the $C_{10}$ alkyl group. Therefore, specifically the second ligand of the present invention may be a thiol carboxylic acid, or the second ligand may be mercaptoundecanoic acid (MUA).

The term "cross-linking agent" is used to describe a compound that is capable of forming a chemical bond between molecular groups on similar or dis-similar molecules so as to covalently bond together the molecules. In the present invention, a suitable cross-linking agent is one that couples amines to carboxyl groups, for example N-(3-dimethylaminopropyl)-N'-ethylcarbodiimide (EDC), and dicyclohexylcarbodiimide (DCC).

The term "small organic molecule" is used to describe an organic compound either synthesized in the laboratory or found in nature. Typically, a small organic molecule is characterized in that it contains several carbon-carbon bonds, and has a molecular weight of less than 1500 grams/Mol. In the present invention, a small organic molecule can be an amino acid, such as a basic amino acid, and more particularly the amino acid lysine. As well, in the present invention, a small molecule can also be a substituted dicarboxylic acid, such as diaminopimelic acid. The small organic molecule interacts with the carboxylic acid group provided at the exposed end of each second ligand to result in the formation of an amide bond between adjacent second ligand molecules attached to the cap of the quantum dot while at the same time leaving exposed a polar group such as a carboxylic acid group if the small organic molecule in question is lysine.

The term "biomolecule" is used to describe a synthetic or naturally occurring protein, glycoprotein, lipoprotein, amino acid, nucleic acid, nucleotide, carbohydrate, sugar, lipid, fatty acid and the like.

The term "conjugate" is used to describe the quantum dot described above and a biomolecule wherein the biomolecule is attached to the quantum dot either directly or indirectly by any suitable means. The biomolecule can be attached to the quantum dot by being covalently bonded to the exposed polar group of the small organic molecule, for example, to the carboxyl group of the lysine that cross-links together the second ligand molecules. Indirect attachment of the biomolecule can occur through the use of a "linker" molecule, so long as the linker does not negatively affect the luminescence of the quantum dot or the function of the biomolecule. It is preferred that the linker be one that is bio-compatible. Common molecular linkers known in the art include a primary amine, a thiol, streptavidin, neutravidin, biotin, or a like molecule. In the context of the present example of the invention, a suitable linker is EDC.

EXAMPLE

The following example is included to illustrate the present invention, and should not be used to limit the claims in any way. The parts and percentages are by weight unless otherwise indicated.

Preparation of Quantum Dots (QDs) Coated with the Second Ligand

To obtain a quantity of water-soluble quantum dots for subsequent utilization in a cross-linking procedure, one gram of mercaptoundecanoic acid (MUA) (Aldrich, 95%) was added to a 3-neck flask and melted at 65° C. under argon to provide a liquid MUA solution. The molecules of MUA function as the second ligand coating the cap of the QD on displacing the first ligand from the cap of the QD. Quantum dots having a core comprising CdSe and a cap comprising ZnS were prepared using a known organometallic procedure. See the following references for a description of this procedure.

Hines, M. A., Guyot-Sionnest, P. "Synthesis of strongly luminescing ZnS-capped CdSe nanocrystals" *J. Phys. Chem. B*, 100, 468–471 (1996); Peng, X. G., Schlamp, M. C., Kadavanich, A. V., Alivistos, A. P. "Epitaxial growth of highly luminescent CdSE/CdS core/shell nanocrystals with photostability and electronic accessibility" *J. Am. Chem. Soc.*, 199, 7019–7029 (1997); Dabbousi, B. O. et al. "(CdSe)ZnS core-shell quantum dots: synthesis and characterization of a size series of highly luminescent nanocrystallites" *J. Phys. Chem. B*, 101, 9463–9475 (1997).

Quantum dots are commercially available from, for example, Quantum Dot Corporation and Evident Technologies.

In the present example, these quantum dots were provided with a coating of trioctylphosphine oxide (TOPO) as the first ligand. The molar concentration of these QDs was determined using the molar absorptivity value from the published report by Yu et al. (*Chem. Mater.*, 2003, 15, 2854–2860). A quantity less than about 100 mg of the TOPO-coated QDs were injected into the MUA-solution. This can be done either in a Schlenk Line system or in air. The quantity of MUA to TOPO-coated QDs was such that the MUA was in approximately 8,000 times molar excess to the TOPO-coated QDs so as to adequately coat yellow-emitting QDs ($\lambda_{em}$=580 nm) with MUA. A person of skill in the art will understand that the concentration of MUA to TOPO-coated QDs will have to be adjusted for different sizes of QDs in order to achieve optimal results. Following injection of the QDs, the temperature of the solution was raised to 80° C. overnight with continuous stirring. After two hours of 80° C. incubation, 25 mL of dimethyl sulfoxide (DMSO) (EMD, 99.9%) was injected into the 3-neck flask, whereupon the solution became optically clear. This solution was stirred for a further two hours, followed by cooling to room temperature whereupon chloroform was added to precipitate out the QDs. Any kind of highly nonpolar solvent can be used in place of chloroform. Precipitated QDs were centrifuged at 3,700 RPM to separate them from unbound MUA that had not become attached to the surface of any given QD on displacement of the TOPO coating. Thereafter, MUA-coated QDs were redissolved in DMSO for a subsequent cross-linking step.

Cross-linking of the Second Ligand on the Surface of the QD

Figure 1:
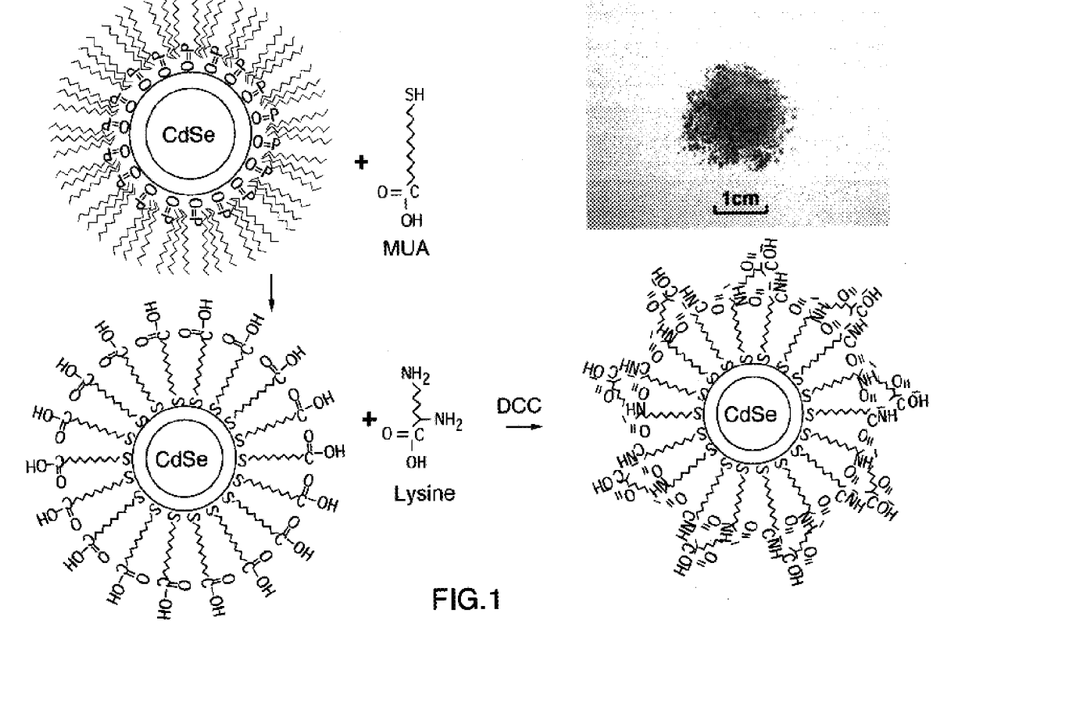
FIG. 1 is a schematic diagram generally showing a method of preparing a coated QD of the present invention, together with a photograph of a 400 mg sample of a quantum dot preparation.

A method according to the present invention of preparing a quantum dot having a cross-linked ligand present on its surface is generally illustrated in the schematic diagram of FIG. 1, while a population of such dots is shown in the photograph provided as an inset in FIG. 1.

Prior to undertaking a cross-linking of the second ligand molecules that were attached to the cap of the QD, the following solutions were prepared: solution (A) comprised DL-lysine (Aldrich, 98%) dissolved in phosphate buffer saline (PBS) (10 mM, pH=7.4), resulting in a concentration of about 16,000 lysine molecules/QD, while solution (B) comprised dicylcohexylcarbodiimide (DCC) (Aldrich, 99%) dissolved in DMSO at 5 times the concentration of lysine. Solutions A and B>1 mL were directly added to MUA-coated QDs and the resultant solution, which became cloudy immediately upon mixing, was stirred for 2 hours at room temperature. Large aggregations of QDs began to form in the solution after approximately 30 minutes of stirring, such large aggregations being indicative of the cross-linking of the second ligand on the surface of the QDs and the QDs began to precipitate from the solution. Aggregated QDs were recovered by centrifugation at 3700 RPM for 5 minutes, followed by washing twice with tetrahydrofuran (THF) to remove MUA molecules that were weakly attached to the QDs. Recovered, washed QDs were re-dissolved in distilled water and dialyzed overnight using a membrane dialysis having a pore size of 12 to 14 kDa and made of regenerated cellulose to remove uncross-linked MUA against distilled water. As MUA is insoluble in distilled water, that which was desorbed from the surface of the QDs appeared as a white precipitate inside the dialysis tube, and was removed using a syringe filter (Sigma, 0.22 µm pore diameter). For final recovery, the QDs having cross-linked second ligand on their surface were precipitated from the aqueous solution with the addition of THF or excess salt (>500 mM) and recovered by centrifugation at 3000 RPM, for five minutes. Recovered, cross-linked QDs were washed once with THF, re-centrifuged, and dried overnight to a powder in a fume hood at room temperature. It is also possible to take this aqueous solution of quantum dots and place it in a lyophilizer for preparation of powdered quantum dots. The resultant powdered cross-linked QDs were stored at room temperature in air (short term) or under nitrogen for long-term storage (>1 year). Using an initial quantity of TOPO-coated QDs as described, a per batch quantity of approximately 400 mg of powdered QDs were prepared using the method as described. A person of skill in the art will, of course, appreciate that the method of the present invention allows for the production of various sizes and quantities of powdered QDs depending upon the amount of TOPO-coated QDs that are utilized as starting material, and that larger quantities than those as described can be prepared.

Further cross-linking of the QDs can be accomplished by incubating the QDs in PBS (10 mM, pH=7.4) in the presence of excess lysine and cross-linking agent N-(3-Dimethylaminopropyl)-N'-ethylcarbodiimide (EDC) (Sigma-Aldrich).

It is predictable that other types of small organic molecules, such as diaminopimelic acid (Sigma-Aldrich), can be used to cross-link adjacent MUA molecules present on the surface of the QD via the carboxylic acid group on the MUA, thereby forming a stable coating or shell on the QD. It is believed that most types of molecules that contain at least 2 primary amino groups and 1 carboxylic acid can be used.

Quality Assessment of Powdered QDs

Figure 2A:
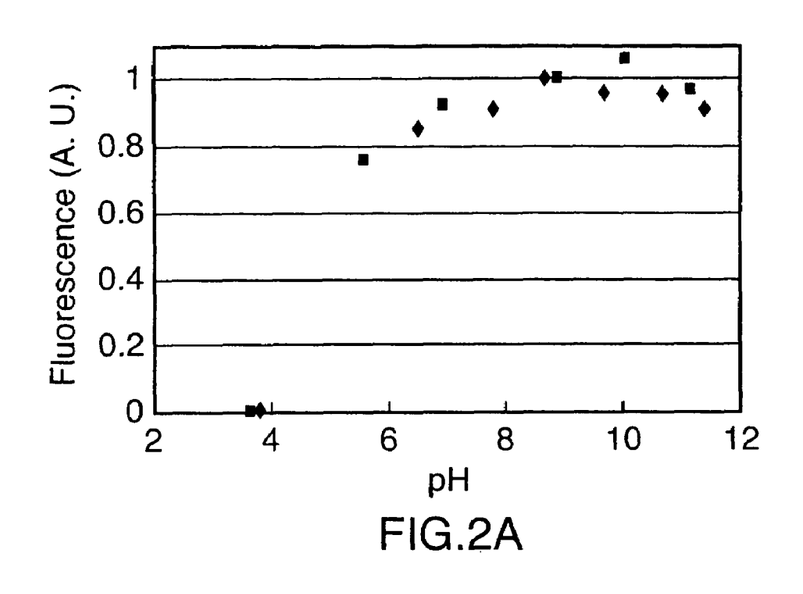
FIG. 2 is a graphical representation showing aggregation stability and optical properties of quantum dots prepared in accordance with the method of the present invention.

Powdered quantum dots produced in accordance with the method of the present invention were assessed for their ability to maintain their luminescent property and to remain in a monodispersed state upon being re-dissolved in an aqueous solution under a variety of conditions. Samples of QDs were re-dissolved in water, the pH of which was adjusted through the drop-wise addition of NaOH or HCl (greater than 100 mg can be dissolved in 1 mL of distilled water) and monitored with a pH meter, and as shown for the two samples presented in FIG. 2A, the fluorescene of the re-dissolved QDs did not fluctuate greatly over the pH range of about 4 to 12. Lack of fluorescence observed at a pH of less than 4 could possibly be attributed to an acid etching effect upon the QDs or a breakdown of the QDs under highly acidic conditions.

Figure 2B:
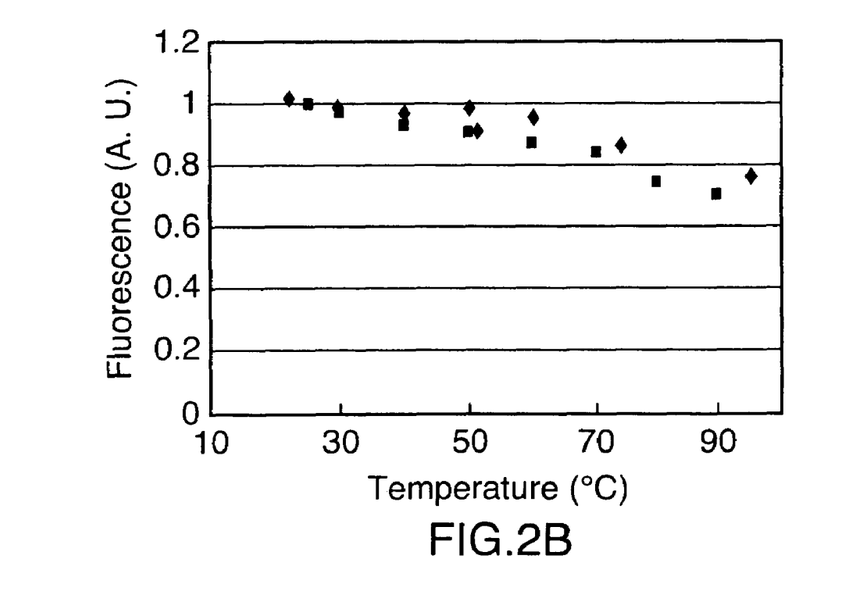

Quantum dots produced in accordance with the method of the present invention could be subjected to various ranges of temperatures, for example, those commonly used in conjunction with the performance of a polymerase chain reaction, or in cell-incubation studies, or under the elevated (up to 70° C.) temperature conditions found in DNA hybridization experiments. To assess whether quantum dots manufactured according to the method of the present invention could remain luminescent over a varying temperature range (25° C. to 70° C.), aliquots of the powdered QDs were dissolved in water (1 mg/mL) and heated to varying temperatures and the fluorescence measured using a spectrofluorimeter (Fluoromax, Jobin -Yvon, $\lambda_{ex}$=350 nm, $\lambda_{em}$=580 nm). Referring to FIG. 2B, the quantum yield of the dissolved quantum dots decreased in a linear relationship the increased temperatures to which the dots were exposed. Effects of increased temperature exposure were not permanent, however, as the quantum yield of the dissolved quantum dots returned to original temperature upon cooling of the dots.

Figure 3:
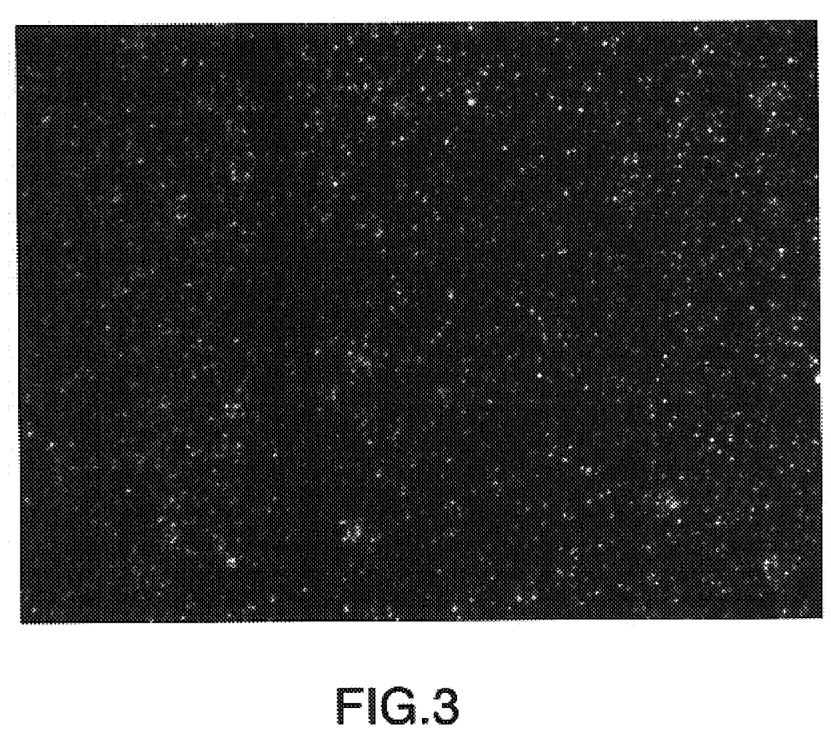
FIG. 3 is a light micrograph showing a monodispersion of a population of quantum dots produced in accordance with the method of the present invention.

Quantum dots, produced in a powdered format in accordance with the method of the present invention, retained the ability to remain in a monodispersed state after being re-dissolved in an aqueous solution for an extended period of time. Referring to FIG. 3, a quantity (10 mg/mL) of QDs in powdered form was dissolved in 10 mM phosphate buffered saline (PBS) of pH 7.4, and after 10 days in solution, an aliquot of the dissolved QDs were spread on a glass cover slip and imaged using an epifluorescence microscope (Olympus, 100×, N.A.=1.4, 100 W Hg lamp, $\lambda_{ex}$=530+/−30 nm, $\lambda_{em}$=610+/−40 nm). As shown in FIG. 3, the dissolved QDs were present as individually fluorescing entities as opposed to an aggregate of dots. The monodispersity of the powdered form of the quantum dots dissolved in various saline (NaCl) concentrations was also confirmed by epifluorescence microcopy (which is single quantum dot image analysis).

Figure 4A:
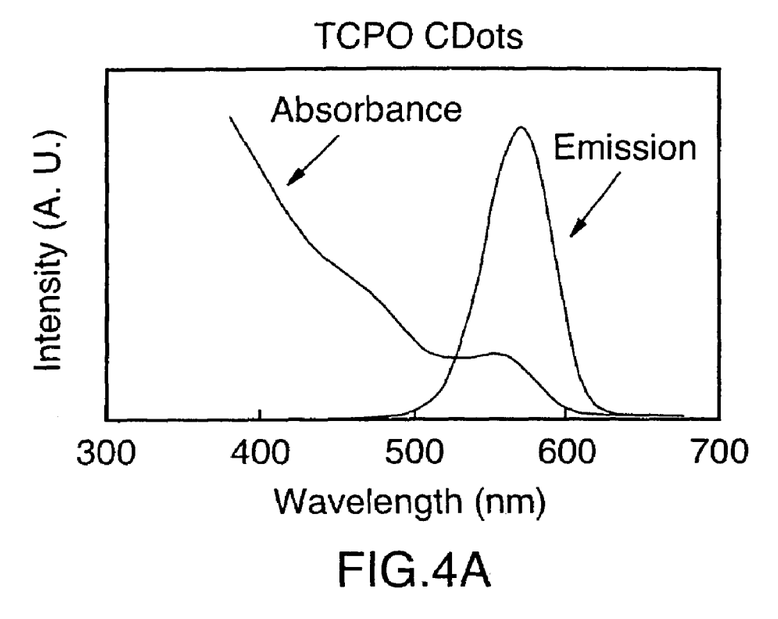
FIG. 4 is a graphical representation showing optical properties of quantum dots produced in accordance with the method of the present invention.
Figure 4B:
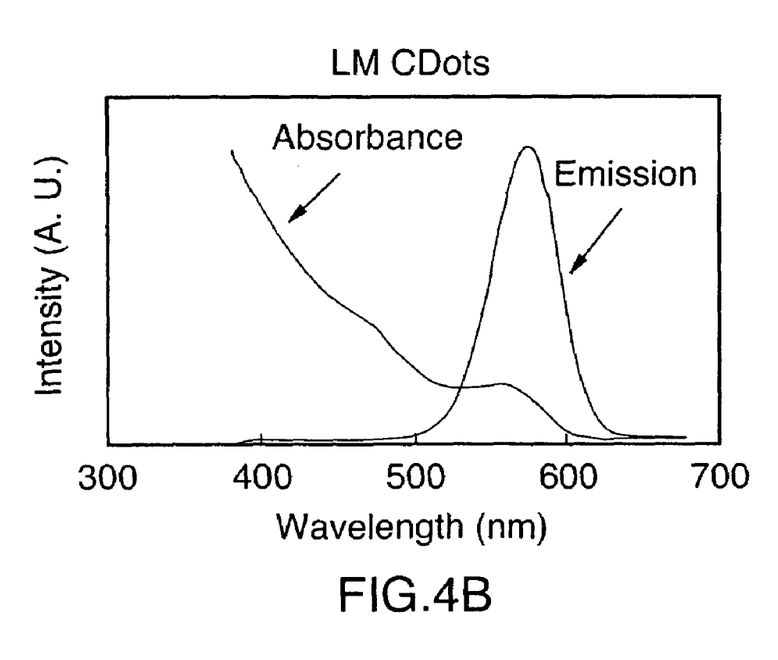

To confirm that the quantum dots produced using the method of the present invention did not have altered absorbance and emission characteristics, samples of the powdered form of the quantum dots were tested. As indicated in FIG. 4, when compared to quantum dots having the TOPO ligand on the surface of the dot, quantum dots having the cross-linked MUA ligand on their surface exhibited no observable change in either the absorbance or emission spectra. The quantum dots were examined under epifluorescence imaging, fluorescence spectroscopy, and absorbance spectroscopy.

Figure 5A:
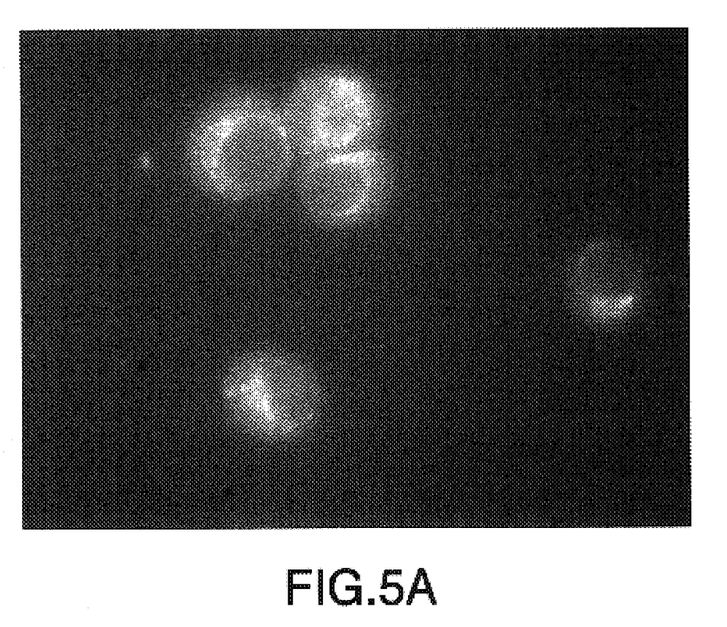
FIG. 5 is a light micrograph showing a population of mammalian culture cells with endocytosed protein-conjugated quantum dots produced according to the method of the present invention.
Figure 5B:
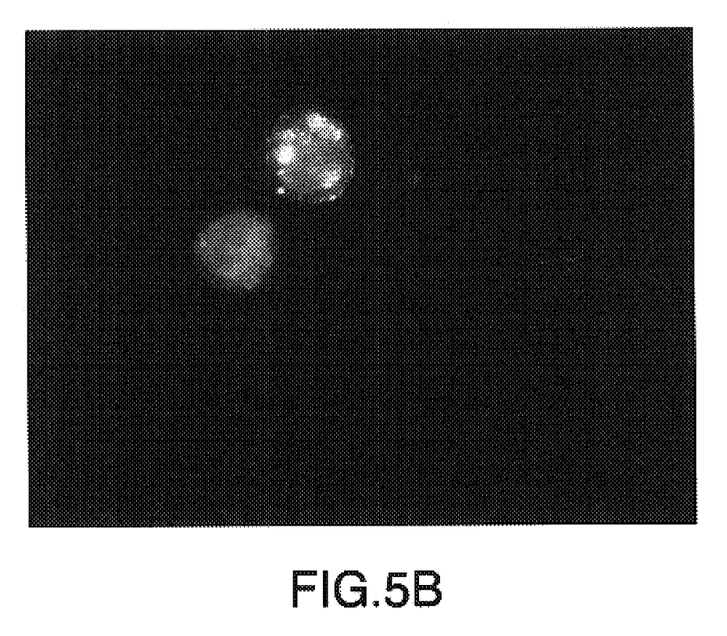

Quantum dots produced in accordance with the method of the present invention can be conjugated to various biomolecules, such as proteins or antibodies. The QDs can be conjugated to any biomolecule containing primary amino functional groups. Depending on the biomolecule with which the quantum dot is conjugated, the resulting conjugate can be used as a probe to detect the presence of a biomolecule that may be present within a sample, for example, to detect whether a specific protein or nucleic acid is present in a protein or nucleic acid sample that has been isolated from an organism or group of organisms and electrophoresed through an acrylamide or agarose gel. To demonstrate the ability of the quantum dots having a cross-linked ligand on their surface to form a conjugate with a biomolecule, a stock solution was prepared by dissolving 10 mg/ml of the powdered quantum dots in double distilled water. 15 µl of the stock solution was mixed with 20 µl of a 10 mg/ml solution of the protein transferrin (Sigma-Aldrich) in PBS (10 mM, pH=7.4). To conjugate the protein to the quantum dot, 10 µl of 50 mM stock solution (dissolved double distilled water) of the cross-linking agent EDC was added to quantum dot—protein mixture and the mixture shaken at room temperature for two hours to allow the conjugation reaction to occur. The entire volume of QD-transferrin conjugate was then transferred to a culture of HeLa cells (30–50% confluence, cells were grown at 37° C. and 5% $CO_2$ in a 15 mm×100 mm tissue culture dish in the presence of Dulbecco Minimum Essential Media (Gibco) supplemented with 10% Fetal Bovine Serum (Sigma), 1% penicillin (Sigma), and 1% amphotericin B (Sigma)) and incubated overnight in 37° C. Cells were washed repeatedly after the overnight incubation, and thereafter observed microscopically. For controls, cells were incubated with either a solution of unconjugated-QDs, or tranferrin/QD without EDC to HeLa cell cultures. Referring to FIG. 5, when subjected to excitatory radiation (100 W Hg excitation, emission filters 610+/−40, and QDs ($\lambda$ex=350 nm, $\lambda$em=580 nm)) HeLa cells incubated in the presence of the QD-transferrin conjugate exhibited a fluorescent pattern consistent with having endocytosed the QD-transferrin conjugate (micrograph A), while control cells exhibited low autofluorescence (micrograph B).

All parameters expressed herein may be combined in any desired and suitable manner to create additional combinations or embodiments of the invention and such combinations are all within the scope of the invention disclosed herein. All parameters expressed herein may be combined in any desired and suitable manner to create additional combinations or embodiments of the invention and such combinations are all within the scope of the invention disclosed herein.

The invention claimed is:

1. A method for manufacturing powdered quantum dots comprising the steps of:
   a) reacting quantum dots comprising a core, a cap and a first ligand associated with the outer surfaces thereof with a second ligand, the second ligand displacing the first ligand and attaching to the outer surfaces of the quantum dots, and the second ligand is present in molar excess of at least about 4,000 compared to the quantum dots having the attached first ligand population,
   b) isolating the quantum dots having the attached second ligand from the reaction mixture,
   c) reacting the isolated quantum dots having the attached second ligand with a small organic molecule whereby the small organic molecule attaches to the second ligand,
   d) reacting the quantum dots having the attached small organic molecule with a cross-linking agent to cross-link the small organic molecule attached to the second ligand with an adjacent second ligand attached to the surfaces of the quantum dots,
   e) isolating the quantum dots formed in step (d); and
   f) drying the isolated quantum dots to form powdered quantum dots.

2. The method of claim 1, wherein the second ligand is a compound having a formula ROC—$(CH_2)_n$—COOH, where R is a thiol, and n is a whole integer in the range of 8 to 13.

3. The method of claim 1, wherein the second ligand is mercaptoundecanoic acid.

4. The method of claim 1, wherein the small organic molecule is selected from molecules containing at least two amino groups and one carboxylic acid group.

5. The method of claim 4, wherein the organic molecule is lysine.

6. The method of claim 4, wherein the small organic molecule is a compound having a formula $R_1$OC—$(CH_2)_n$—$COR_2$ where each of $R_1$ and $R_2$ is an amine group and n is a whole integer in the range of 8 to 13.

7. The method of claim 1 further comprising the steps of:
   a) dissolving the powdered quantum dots in an aqueous solution; and
   b) contacting the dissolved quantum dots with a biomolecule whereby the quantum dot and the biomolecule form a conjugate.

8. The method of claim 7, wherein the biomolecule is selected from the group comprising a protein or an antigenically reactive fragment thereof, an antibody or an antigenically reactive fragment thereof and a nucleic acid.

9. A method of detecting a biomolecule in a sample comprising the steps of:
   a) contacting the sample with a conjugate prepared by the method of claim 8, whereby the biomolecule to be detected specifically binds to the biomolecule conjugated to the quantum dot; and
   b) detecting luminescence, wherein the detection of luminescence is indicative of the presence of the biomolecule in the sample.

10. A water-soluble powder comprising quantum dots manufactured according to the method of claim 1.

11. The method of claim 2, wherein the small organic molecule is selected from molecules containing at least two amino groups and one carboxylic acid group.

12. The method of claim 11, wherein the organic molecule is lysine.

13. The method of claim 11, wherein the small organic molecule is a compound having a formula $R_1$OC—$(CH_2)_n$—$COR_2$ where each of $R_1$ and $R_2$ is an amine group and n is a whole integer in the range of 8 to 13.

14. The method of claim 2 further comprising the steps of:
   a) dissolving the powdered quantum dots in an aqueous solution; and
   b) contacting the dissolved quantum dots with a biomolecule whereby the quantum dot and the biomolecule form a conjugate.

15. The method of claim 14, wherein the biomolecule is selected from the group comprising a protein or an antigenically reactive fragment thereof, an antibody or an antigenically reactive fragment thereof and a nucleic acid.

16. A method of detecting a biomolecule in a sample comprising the steps of:
   a) contacting the sample with a conjugate prepared by the method of claim 14, whereby the biomolecule to be detected specifically binds to the biomolecule conjugated to the quantum dot; and
   b) detecting luminescence, wherein the detection of luminescence is indicative of the presence of the biomolecule in the sample.

17. A method for manufacturing powdered cross-linked lysine-mercaptoundecanoic acid (MUA) quantum dots comprising the steps of:
   a) reacting quantum dots comprising a CdSe core with a cap comprising ZnS and having a coating of trioctylphosphine oxide (TOPO) as a first ligand with mercaptoundecanoic acid (MUA) in 8,000 times molar excess to the trioctylphosphine oxide-coated quantum dots;

b) isolating the MUA-coated quantum dots from the reaction mixture;
c) reacting the MUA-coated quantum dots with lysine as the small organic molecule;
d) cross-linking the product of step c) with dicyclohexyl carbodiimide to obtain cross-linked lysine-MUA-coated quantum dots;
e) recovering the cross-linked lysine-MUA quantum dots; and
f) drying the recovered cross-linked lysine-MUA quantum dots to obtain a powder.

* * * * *